Patented Jan. 31, 1950

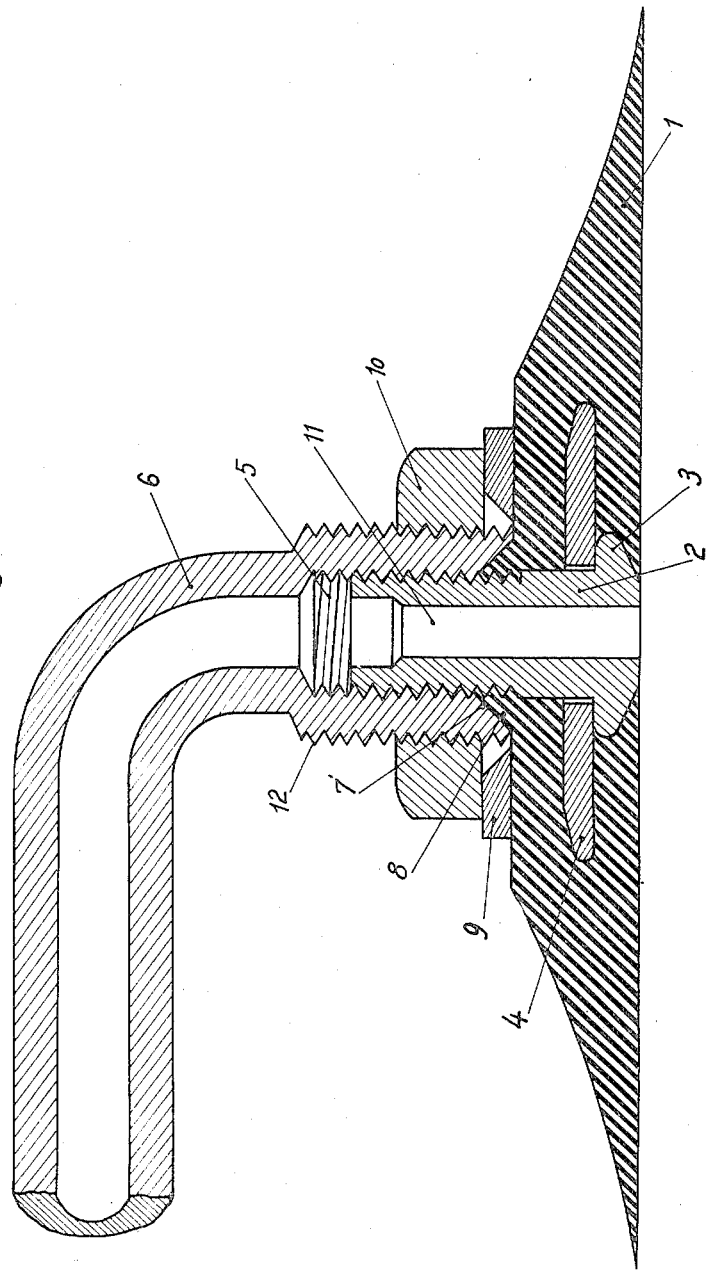

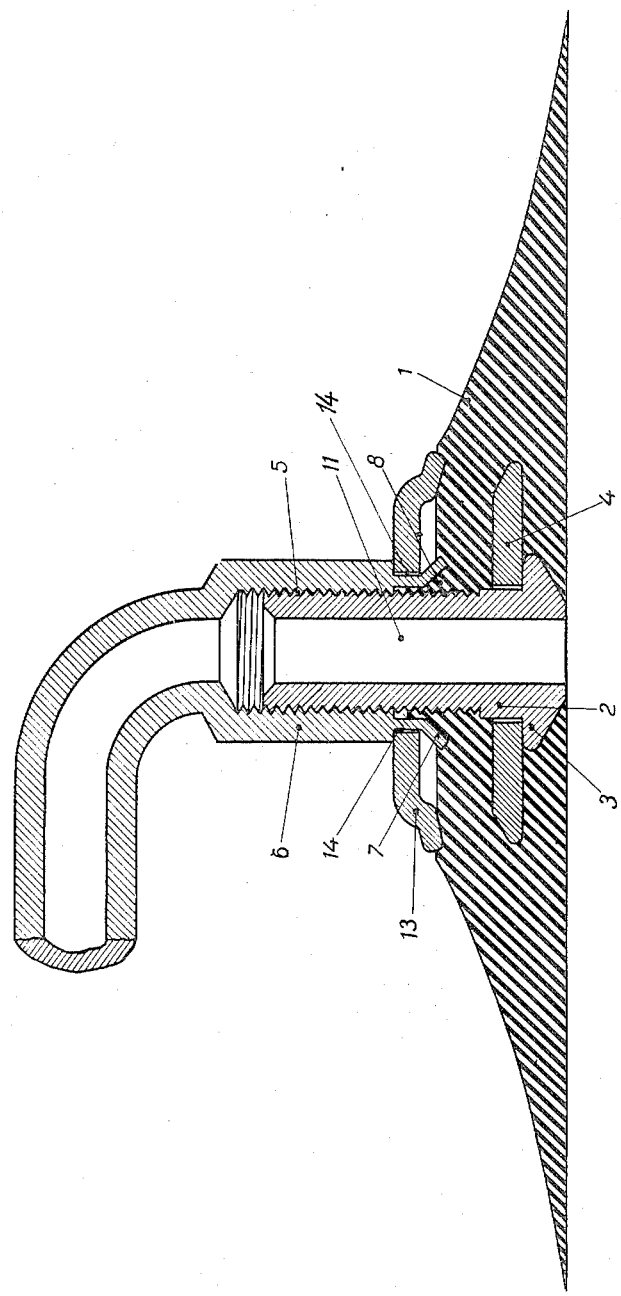

2,495,955

UNITED STATES PATENT OFFICE 2,495,955

VALVE FOR TIRES

Pierre Marcel Bourdon, Paris, France, assignor to Manufacture de Caoutchouc Michelin (Puiseux, Boulanger & Cie) Clermont-Ferrand, Puy-de-Dome, France, a French corporation Application November 26, 1946, Serial No. 712,385
In France February 12, 1943

1 Claim. (Cl. 152—429)

In the present manufacture of tubes, each tube is furnished with a valve that is a permanent fixture and in one single piece. Now, there are available several kinds of valves that differ according to the kind of wheel on which the pneumatic tyre is fixed. It becomes thus necessary to keep in stock tubes fitted with the various valves in standard use, that leads to serious tying-up of capital.

Our invention provides a cure for this objection. It is based on the manufacture of valves in two parts: one part is a permanent fixture on the tube and forms the foot of the valve and another part known as the body of the valve is capable of being fitted to the first part in an airtight manner and of being angularly directed in case of necessity in a different way in relation to the first part. This allows the first part of the valve to assume a shape that is universal for every type of valve and to fit to it a second part with the shape and the angular setting desired, in such a way that the grouping of the two parts provides the sort of valve wanted.

It is thereby sufficient to keep a supply of tubes all of which are furnished with the same valve foot-piece to which can be fixed a suitable valve-body in compliance with requirements.

In accordance with a method of carrying into effect the invention, the valve foot-piece is bedded in a rubber slab or bed-plate that is then cemented in a suitable way on to the tube that has an opening to let the air through; this valve foot-piece is provided with an outside thread and the valve body is tapped with a thread to correspond, a conical projection or edging of rubber is given to the base-piece surrounding the valve foot-piece and on the valve-body is supplied a conical seating for the projection so that when it is screwed up the conical projection or edging is jammed hard up, this ensuring airtightness. In accompanying drawing given out by way of example, Fig. 1 illustrates a section through the axis of a form of execution of the invention.

Fig. 2 shows a modification.

In Figure 1, the valve foot-piece made up of a stem 2 containing an air-passage 11, is threaded on the outside at 5 and finished off at its lower end with a bulge or beading 3. The lower section of the stem is bedded in a base-piece 1 of rubber and is stuck to this base; it is held moreover by a ring 4 also bedded in the base-piece 1, cemented to it, and pressing on the beading 3. At 6, is shown a portion of the valve-body. In the method illustrated, it is screwed on to the foot-piece 2.

The airtightness of the combination is ensured by the following means.

At the bottom end of the valve-body 6 is a cone 7 that bears on a conical portion 8 of the base-piece 1. A nut 10 is screwed on to an outside thread 12 of the valve-body and is pressed against the base-piece over a ring 9. This nut plays the part of a lock-nut for the screwing together of the body and foot-pieces. It will be manifest that this arrangement allows the body 6, should it be required, to be given the angular setting wanted in relation to the foot-piece without impairing the airtightness.

In fact, the elasticity of the cone 8 of the base-piece is such that the direction of the body 6 may alter by a certain fraction of a turn without in any way reducing the airtightness of the connection. Moreover, the lock-nut 10 prevents any slackness or any variation in the setting of the body 6 in relation to the foot 2 of the base-piece 1.

In the case illustrated in Fig. 2, the arrangement shown is simpler in construction. The securing members 12, 10, 9 are done away with and the following means substituted:

The movable portion shows a recess 14 near its end in which a ring 13 can turn freely and press on the base-piece 1. When screwing up, this ring prevents the action going too far, and thereby damaging the conical joint 7—8. The ring 13 can turn freely in relation to the rod 6 and bears translationally without any rotation on the base-piece 1, that avoids the "kinking" of the rubber of the base-piece.

In this form of execution also the elasticity of the cone 8 of the base-piece 1 is enough to allow a change of direction of a fraction of a turn to the movable portion 6 without the elasticity of the connection being impaired.

It is clear that the projecting conical-shaped part 7 could be substituted by a beading of similar shape, for instance with a rectangular of semi-circular cross-section.

What I claim is:

A tire valve comprising in combination a tubular rigid straight stem, a base of rubber embedding a flat ring which surrounds the base of the straight stem said base of rubber engaging the periphery of the rigid straight stem, a bent rigid tubular stem a side of which surrounds and matches the external surface of the straight stem, the extremity of this side being formed with a projecting part adapted to coact with the base of rubber and with an annular groove on its outer surface near its inner end, a thread cut on the outer surface of the straight stem, a complemental thread on the inner surface of the coacting side of the bent stem, and a dished washer the inner edge of which is loosely housed in the aforesaid annular groove, the outer end of said washer and the projection of the extremity of the bent stem bearing at the same time on the rubber base piece when the bent stem is screwed over the straight stem.

PIERRE MARCEL BOURDON.

REFERENCES CITED

The following references are of record in the file of this patent:

UNITED STATES PATENTS

| Number | Name | Date |
|---|---|---|
| 1,507,647 | Williams | Sept. 9, 1924 |
| 1,819,150 | Crowley | Aug. 18, 1931 |
| 1,903,395 | Crowley | Apr. 4, 1933 |
| 2,015,592 | Crowley | Sept. 24, 1935 |
| 2,043,380 | Kirkpatrick et al. | June 9, 1936 |
| 2,090,089 | Wiegand | Aug. 17, 1937 |
| 2,143,837 | Becker | Jan. 17, 1939 |